United States Patent [19]

Midland et al.

[11] Patent Number: 4,527,192

[45] Date of Patent: Jul. 2, 1985

[54] INDEX SIGNAL ENHANCEMENT CIRCUIT

[75] Inventors: Richard W. Midland, Inverness; Boris Rozansky, Skokie, both of Ill.

[73] Assignee: Zenith Electronics Corporation, Glenview, Ill.

[21] Appl. No.: 470,884

[22] Filed: Feb. 28, 1983

[51] Int. Cl.³ .............................................. H04N 9/24
[52] U.S. Cl. .................................................... 358/67
[58] Field of Search ...................... 358/64, 67, 66, 69, 358/70

[56] References Cited

U.S. PATENT DOCUMENTS 4,268,857  5/1981  Isono ...................................... 358/67
4,281,340  7/1981  Mitamura ............................... 358/67
4,408,223 10/1983  Midland ................................. 358/67
4,468,690  8/1984  Midland ................................. 358/67

Primary Examiner—Michael A. Masinick

[57] ABSTRACT

A color display system includes an index CRT and a photo multiplier tube for developing an index signal in response to electron bombardment of regularly spaced phosphor index strips overlying the screen on the tube. Correction means, including time delayed and inverted blue and red video signals, produce opposite polarity signals that are added to the output of the photo multiplier tube to correct the index signal. A pulse generator produces the square wave index signal. The output of the pulse generator is gated between index pulses for noise purposes.

12 Claims, 3 Drawing Figures

INDEX SIGNAL ENHANCEMENT CIRCUIT

CROSS REFERENCE TO RELATED PATENT APPLICATION

This application is related to pending application Ser. No. 270,944 filed June 5, 1981 now U.S. Pat. Nos.4,408,223 dated Oct. 4, 1983 and 4,468,690 dated Aug. 28, 1984 in the name of Richard W. Midland and assigned to Zenith Radio Corporation, which appliction is incorporated by reference herein.

BACKGROUND OF THE INVENTION AND PRIOR ART

This invention relates generally to high resolution color cathode ray tubes (CRT's) and specifically to color cathode ray tubes of the index type.

Index color CRTs are well known for their excellent resolution capabilities which are generally much superior to those of the more common color CRTs which have a shadow mask electrode interposed between the electron sources in the tube neck and the groups of colored light-emitting phosphors on the tube faceplate. The shadow mask functions in cooperation with the mechanically or electrically offset electron sources to shield each different "color" phosphor from electrons emanating from all but its respective source, or as is more commonly referred to, electron gun. Shadow mask CRTs are used extensively in commercial television receivers. For many video and graphics display systems, for an ever increasing number of computer terminals, and for many instrumentation uses, a much greater degree of resolution is desired than is obtainable from shadow mask CRTs. The single beam index type color tube is ideally suited to such demanding uses because of its resolution capability and because, at any time, the portion of the phosphor screen being bombarded by the electron beam is known.

The conventional single beam index color CRT includes a faceplate having a pattern of vertically oriented stripes of different colored light-emitting phosphors on its inner surface with each phosphor stripe being separated from its neighboring phosphor stripe by a guard band of inert material, that is material that does not emit light energy under electron bombardment. As is well known, the guard band enables selective energization of the different color phosphors and allows the size of the electron beam to be larger than the width of the phosphor stripes for maximizing the CRT brightness capability. The stripes are arranged in a regular series of colored light-emitting phosphors—generally R, G, and B-corresponding to a stripe of red light-emitting phosphor, a stripe of green light-emitting phosphor and a stripe of blue light-emitting phosphor. The phosphor stripes and the stripes of inert material are collectively referred to as a screen. The side of the screen closest to the electron source is covered with a vacuum deposited layer of aluminum which not only forms a conductive surface for the screen, but also reflects backwardly directed light emitted by the phosphors toward the faceplate to further enhance brightness of the CRT image.

Also in accordance with conventional index tube construction, special signal areas are disposed at regular intervals on the screen for generating index pulses responsive to impingement by the scanning electron beam. The special areas may comprise narrow index strips of energy-emissive material deposited over the aluminum layer and centered over every third stripe of inert material. The energy-emissive material, responsive to electron bombardment, produces detectable energy. While many types of energy-emissive material may be used, ordinary phosphor is suitable. An excellent phosphor for this use is the common type known as P47 whose light output is bluish and near ultraviolet in the energy spectrum and which has approximately equal rise and fall times. The preferred embodiment of this invention uses such a phosphor, and its light is directed toward the neck of the tube where it is sensed by a photo multiplier tube (PMT) positioned outside of and adjacent to the rear of the CRT envelope. The aluminum layer prevents light emitted by the index strips from reaching the front of the tube.

As the electron beam is deflected across the phosphor screen, the pulses of energy emitted by the index strips are detected by the PMT and processed to form an index signal. As reference to the copending application will show, the index signal, a clock signal, is used to control the delivery of beam modulating video information to assure that the beam is "aimed" at a phosphor stripe of correct color. The clock signal also is used to accurately determine the location of the electron beam on the phosphor screen for proper positioning of displayed video data.

One of the problems addressed in the copending application is that the electron beam, under certain drive conditions, significantly impinges an index strip as well as a color phosphor stripe. This is particularly troublesome when heavily bombarding the color stripes immediately adjacent to an index strip. Under some conditions the index strip pulse may be totally masked by electrons in a beam directed at the adjacent color stripe. The prior art has resorted, in many instances, to narrow-band systems to overcome this difficulty. Such systems introduce other difficulties, especially in the area of scan control which must be made more precise. On the other hand, the present system and the above referenced system in the copending application are wide-band systems which are very tolerant of scan since the index pulses are monitored on an almost instantaneous basis from one index strip to the next. Unlike narrow-band systems which tend to average index pulses to generate an index signal, the wide-band system disclosed in the copending application acts on each index strip and inhibits the generation of an index signal whenever video information is supplied to the CRT.

Another problem in index tubes is that contrast of the displayed image is impaired because of the need for beam current to excite the index strips to generate the index signal, even when there is no video information. The system of the co-pending application additionally discloses means for enhancing the contrast of the displayed image by cutting the beam current off between index strips in the absence of video information and for turning the beam on at a low level when an index strip is anticipated. These techniques are feasible because of the fast response time of the wide-band system which enables reaction to each index strip pulse or the absence thereof.

However, even in a wise-band system the beam energy may need to be severely restricted, at the expense of CRT performance, to enable accurate index signal generation. Thus the resultant limitation on brightness to assure accurate index signal generation may make the tube unacceptable for many applications. Suffice it to say that there is a need to be able to generate accurate index signals even in the face of heavy electron bombardment of adjacent color phosphor stripes.

OBJECTS OF THE INVENTION

A principal object of the invention is to provide a novel color display system.

A further object of the invention is to provide a novel index signal generation system for a color CRT.

Another object of the invention is to provide an index signal generation system for a color CRT which overcomes the deficiencies of the prior art.

A still further object of the invention is to provide an improved index signal generating system for a color CRT which is substantially independent of tube brightness.

SUMMARY OF THE INVENTION

In accordance with the invention a color display system includes a color picture tube including an electron beam deflectable across a faceplate bearing a pattern of periodic stripes of different colored-light emitting phosphor with a plurality of special signal generating areas regularly dispersed among the phosphor stripes, index signal means responsive to the electron beam impinging on the special signal generating areas for developing an index signal denoting the relationship between the electron beam and the pattern, and means for developing and applying a correction signal to the index signal means for compensating for their undesired response to electron beam bombardment of phosphor stripes adjacent to the special signal generating areas.

BRIEF DESCRIPTION OF THE DRAWINGS

Further objects and advantages of the invention will be apparent upon reading the following description in conjunction with the drawings in which.

DESCRIPTION OF THE PREFERRED EMBODIMENTS

Figure 1:
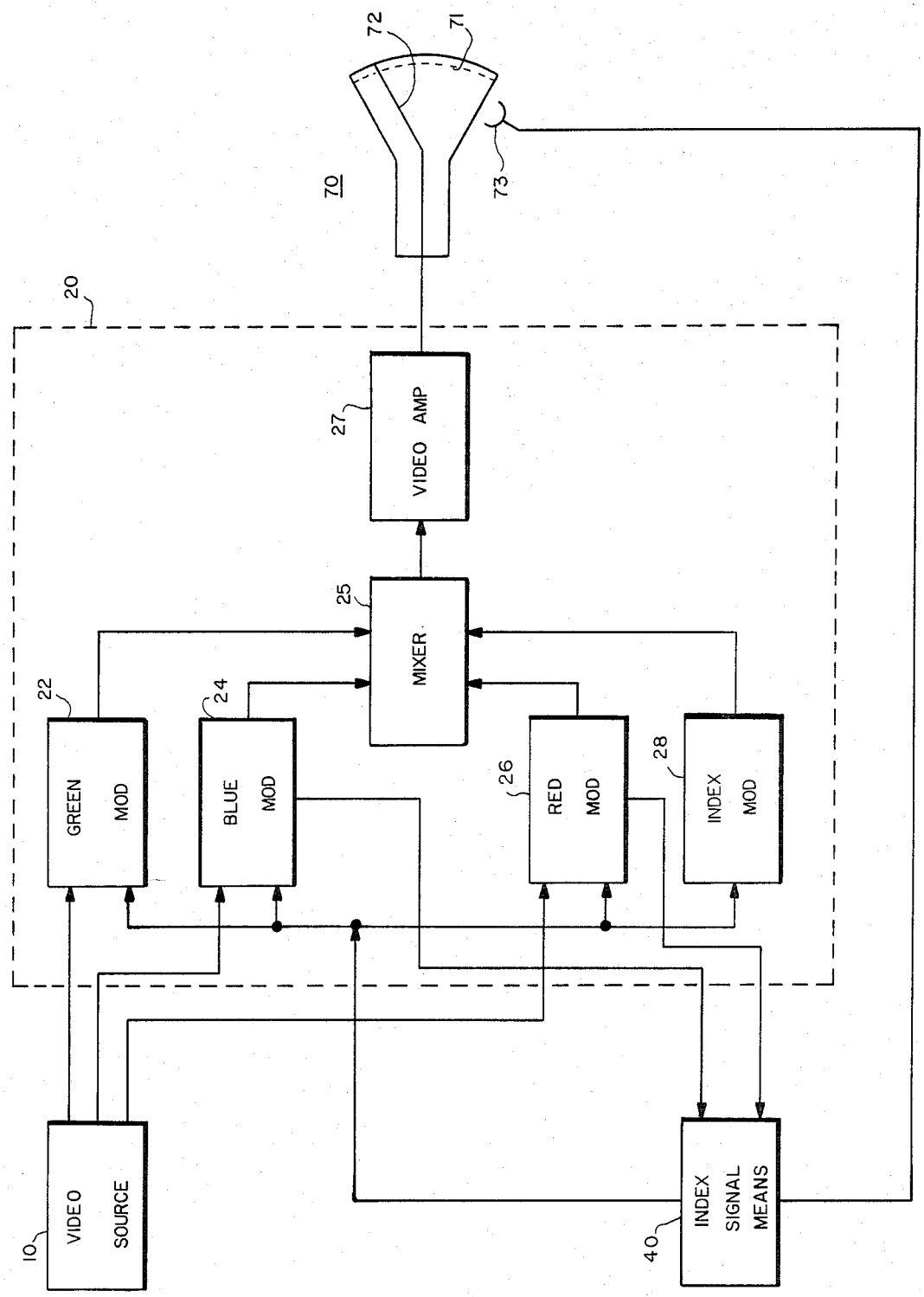
FIG. 1 is a block diagram of the invention.

Referring to FIG. 1, a source of video information 10 supplies a dashed line block 20, generally defining a video modulator that includes a green color modulator 22, a blue color modulator 24, a red color modulator 26 and an index modulator 28. All of the color modulators have inputs supplied from video source 10 and all, including the index modulator, have outputs coupled to a mixer 25 which, in turn, supplies a video amplifier 27. An index signal means 40 supplies all of the modulators with an index signal which is derived from the picture tube. A further connection exists between the outputs of blue modulator 24 and red modulator 26 and index signal means 40.

The output of video amplifier 27 is supplied to the beam modulation electrode of a one gun index color tube 70. Tube 70 includes a faceplate 71, a single electron beam 72 and a PMT 73, positioned outside the tube envelope and responsive to light generated within the tube envelope by the index strips. The output of PMT 73 is coupled back to index signal means 40. As mentioned above, light generated by excitation of the colored light-emitting phosphor of the screen is reflected forward by the thin aluminum layer (not shown) and has little effect on PMT 73, whereas the index strips are positioned on the opposite side of the aluminum layer.

Video source 10 may comprise any of a variety of types of video information including a character generator, a special graphics generator or even a conventional television program. Video modulator 20 will be seen to correspond substantially to the modulator in the above-mentioned copending application. As fully explained in that application, the connection of mixer 25 to index modulator 28 is to turn on the electron beam at a low level when it is in position to strike an index strip and to cut the beam off between index strips to enhance image contrast. In that application the index signal generating means is connected to all of the video modulator outputs and inhibits index signal production whenever video information is being supplied to the tube, that is when any color phosphor stripe is excited by the electron beam. As will be seen, in accordance with the invention a correction signal is generated only when a color phosphor stripe adjacent to an index strip is being excited, and that correction signal is subtracted from the generated index signal.

Figure 2:
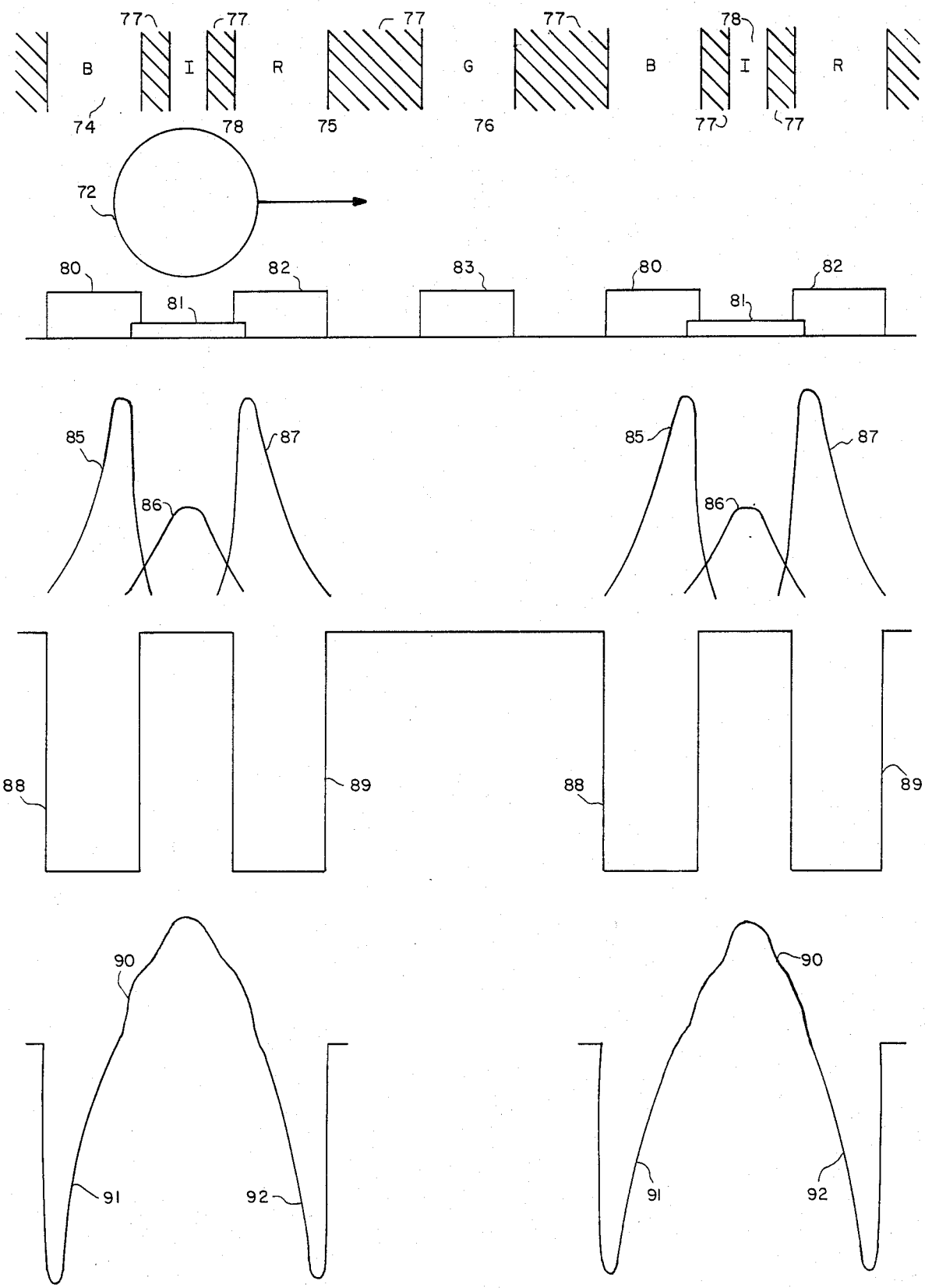
FIG. 2 illustrates the arrangement of the phosphor screen, the electron beam and some waveforms helpful in understanding the operation of the invention.

Referring to FIG. 2, the upper section illustrates a portion of the picture tube screen including colored light-emitting phosphor stripes B, R and G separated by guard bands of inert material comprising black stripes. For example blue stripe 74, red stripe 75 and green stripe 76 are all separated by black stripes 77. Index strips 78 overlie the black stripes 77 that separate the blue and red phosphor stripes.

It will be appreciated that the color stripes, index strips and waveforms of FIG. 2 are idealized to facilitate understanding the invention. Beneath the left index stripe is a depiction of an electron beam 72 which is generally circular in cross section. The area of the circle is a function of beam intensity which, in turn, determines the brightness of the video display. Under maximum video brightness, the beam may have a diameter equal to or somewhat greater than the width of two stripes, assuming color stripes and guard band stripes of equal size. The arrow indicates the direction of movement of the beam. The next waveform represents the video drive signals to the picture tube, which are seen to be generally rectangular wave pulses. Pulses 80, 82 and 83 represent B, R and G video pulses, respectively. Pulse 81 represents a low level index pulse, which as reference to the copending application will show, is applied to the tube just before the beam is positioned to strike an index strip and is removed just after the index strip is passed. The electron beam is kept off, except for subsequent video signals, until the next index strip is reached.

The next set of waveforms should be understood to depict the electron distribution undesirably seen by an index strip as the electron beam is deflected and modulated by video drive signals 80, 81 and 82. Thus the waveform is not normally capable of viewing, and is used to illustrate the inventive concept only. Electron beam 72 is turned on by drive signal 80 just as its center reaches the left hand edge of blue phosphor 74. The number of electrons that strike the index strip 78 increases rapidly until the electron beam is cut off by the termination of drive signal 80 at the right hand edge of blue stripe 74. The distribution of electrons striking the index strip as a result of excitation of the adjacent blue color stripe is illustrated by waveform 85. Similarly waveform 87 depicts the distribution of electrons striking index strip 78 as a result of turning on of electron beam 72 to excite red stripe 75 with drive signal 82. The center waveform 86 illustrates the electron distribution seen by index strip 78 as a result of electron beam 72 being energized by the index drive signal 81 and will be recognized by those skilled in the art as depicting the normal curve of electron distribution in an electron beam. It should be kept in mind that these waveforms only illustrate the electron energy to which the index strip is exposed and not the signal from the photo multiplier tube, which signal is heavily influenced by the phosphor characteristics in converting electron energy into light energy.

At this point, however, it should be clear that the task of finding the middle of waveform 86 to make the proper index signal can be greatly complicated, if not made impossible, by the overwhelming effect of the undesired bombardment by electrons intended for the adjacent color phosphor stripes, as illustrated by waveforms 85 and 87. Thus, the signal output of the photo multiplier tube corresponding to desired excitation of the index strip may be distorted or completely masked.

The next set of waveforms illustrate actual correction signals developed in accordance with the invention whenever the R and B color phosphor stripes are being bombarded. In the preferred embodiment, the correction signals are of fixed amplitude and opposite in polarity to the PMT output and are effective to offset the above illustrated electron energy impinging the index strip when red or blue video is present. Since, as will be seen, the correction signals are applied to a circuit that simulates the phosphor response characteristics before being added to the PMT output, the electron distribution waveform just discussed is a useful tool for determining the needed correction. The signals are also delayed to correct for system delays between a video drive signal and a response from the PMT. These aspects are also described in the above copending application.

The invention recognizes that interference will occur at particular places on the screen and develops correction signals to offset the interference. The final waveform illustrates the effect of adding the correction signals and the PMT output. The overcancelling by the correction signal has little effect on the resultant index signal and assures compensation under all drive conditions.

Figure 3:
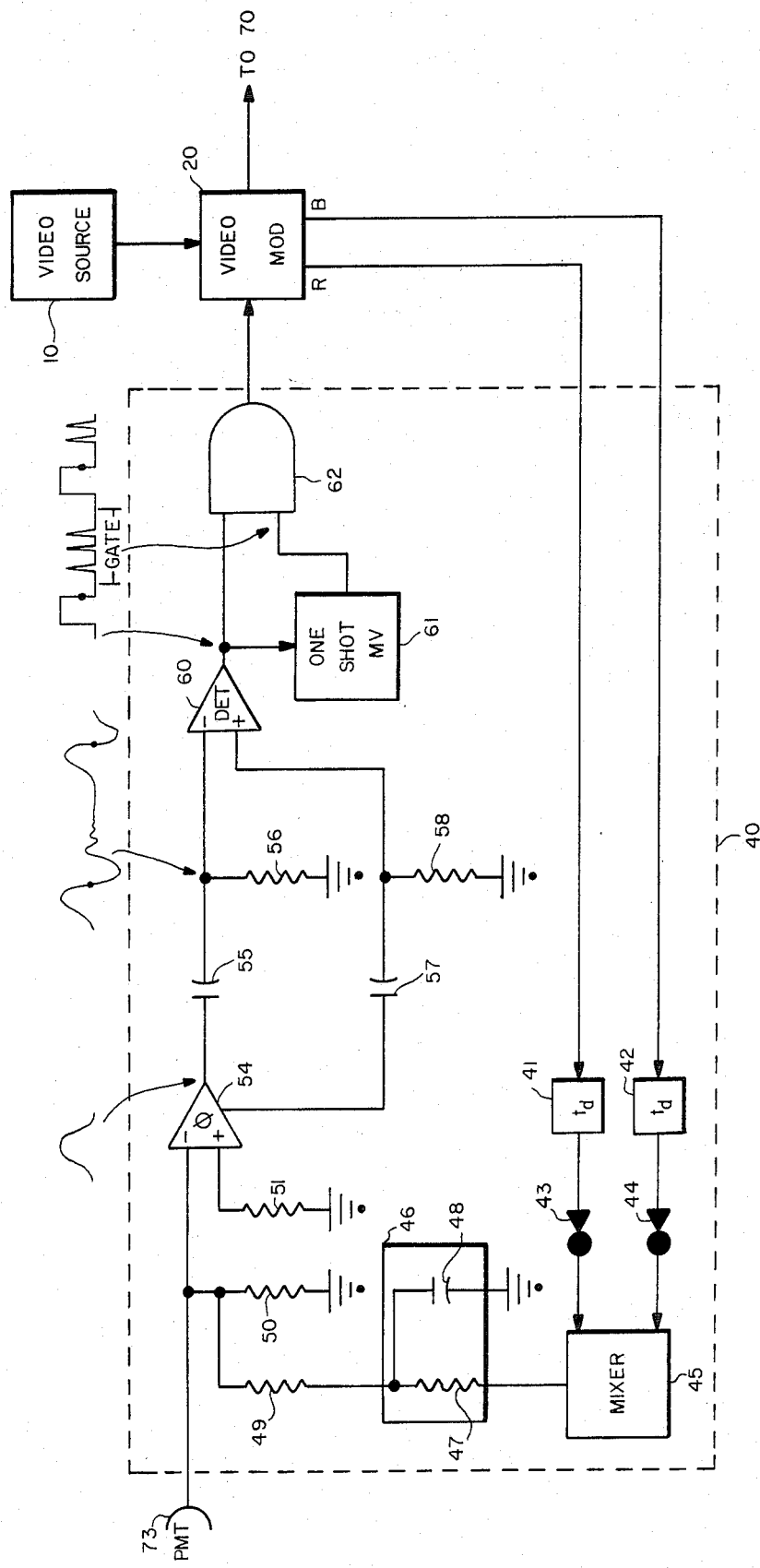
FIG. 3 is a schematic diagram of the index signal means illustrating the signal correction means, with idealized waveforms shown at various points of the circuit.

FIG. 3 illustrates the circuitry of the invention in more detail. Index signal means 40 are included in the dashed line block and are supplied inputs from the R and B outputs of video modulator 20. These inputs are coupled to appropriate time delay circuits 41 and 42 and subsequently through a pair of inverters 43 and 44 to a mixer 45. The combination of elements 41-45 represents signal correction circuitry for producing opposite going pulse signals whenever the electron beam in the tube is bombarding an R or a B phosphor stripe, as determined by outputs of R or B video from video modulator 20. The outputs of mixer 45 is supplied to a phosphor simulation network 46 including a series-connected resistor 47 and a capacitor 48 connected to ground. As described above and in the previous application, this network simulates the response of the type P47 phosphor used for the index strips. The output of the phosphor simulation network is applied to an attenuation network comprising a resistor 49 connected in series with a grounded resistor 50. The junction of these resistors is connected, with the output of photo multiplier tube 73, to the negative input of a phase compensated amplifier 54. Amplifier 54 has a positive and a negative output which are supplied to respective differentation networks. The first differentiation network comprises a capacitor 55 and a resistor 56 and the second comprises a capacitor 57 and a resistor 58. The outputs of these networks are supplied to the plus and minus inputs of a threshold detector 60. The output of threshold detector 60 is supplied directly to one input of an AND gate 62 and indirectly, through a one shot multivibrator 61, to the other input of AND 62. The output of AND 62 is supplied to video modulator 20 which receives video information from video source 10 and controls the video drive for the picture tube.

For simplicity, the waveforms illustrated at points of the circuit depict signal conditions in the absence of video information. Consequently no correction signals are present. The waveform at the output of phase compensated amplifier 54 substantially corresponds to the upper portion of the last waveform of FIG. 2, that is without the effects of video and without signal correction. The next waveform, illustrated at the minus terminal of threshold detector 60, has been differentiated. The small circle indicates the center of the index strip. The differentiator tends to accentuate variations in the high frequency portion of the signal and any noise is exaggerated. Hence the waveform includes some noise in the trailing portion. This is so since the number of photons produced by the index strip is related to the amount of energy it receives. There is only a relatively small variation in the number of photons emitted when the electron beam is at the center of the stripe, resulting in a very small percentage variation and a consequent small amount of noise. As the number of photons decreases, the enegy received diminishes, and any variation in their number becomes a larger percentage of the total. The differentiator exaggerates this effect and produces noisy high frequency output.

This characteristic of a differentiator is of concern when its output is supplied to threshold detector 60 which yields a positive output whenever its net signal input is positive. Under normal conditions the threshold detector produces rectangular wave pulses with well-defined trailing edges denoting the centers of the index stripes. Negative swings of the differentiator output are ignored. In the presence of noise, however, the threshold detector produces a series of short pulses which can disturb the operation of AND gate 62 because it is switched by the edges of its input pulses.

One-shot multivibrator 61 is provided to disable the other input of AND 62 for a predetermined time period less than the time period between index pulses. Consequently the effect of any noise generated, after an index pulse, is blocked out and thereby precluded from falsely triggering AND 62. The waveform at the output of threshold detector 60 illustrates the blocked out portion of signal.

An added advantage of correcting for video on both sides of an index strip is the self-correcting action obtained. Referring back to FIG. 2, it will be noted that should the system turn on video too early, the interference from blue would be substantially less than that from red. Since equal signals are subtracted, the net effect would tend to move the index pulse center toward the right and turn the video on later. Thus the index signal is continually being monitored and corrected.

What has been described is a novel color display system for an index type color tube in which the index signal means are supplied with a correction signal for compensating for distortions and inaccuracies in the index signal resulting from excitation of adjacent color phosphor stripes.

It is recognized that numerous modifications and changes in the described embodiment of the invention will occur to those skilled in the art without departing from its true spirt and scope. The invention is to be limited only as defined in the claims.

What is claimed is:

1. A color display system comprising:
   a color picture tube including an electron beam deflectable across a faceplate bearing a pattern of periodic stripes of different colored light-emitting phosphor with a plurality of special signal generating areas regularly dispersed among the phosphor stripes;
   wide-band index signal means, responsive to said electron beam impinging said special signal generating areas, for developing an index signal denoting the relationship between said electron beam and said pattern, said index signal being subject to distortion resulting from said index signal means undesirably responding to electron beam impingement of phosphor stripes in said picture tube adjacent to said index strip; and
   correction means in said index signal means for developing a correction signal for compensating said distortion by offsetting the effects of the video drive signals corresponding to said adjacent index strips on said index signal means.

2. The display system of claim 1 wherein said correction signal developed by said correction means is opposite in polarity to the index signal produced by said index signal means.

3. The display system of claim 2 wherein said picture tube includes a layer of light reflecting alumnium over said stripes of different colored light-emitting phosphors and wherein said special signal generating areas comprise index strips of light-emitting phosphor on said aluminum layer and further including:
   a photo multiplier tube producing a signal responsive to the light output from said light-emitting phosphor of said index strips.

4. The display system of claim 3, further including video modulator means for generating said video drive signals corresponding to desired excitation of the phosphor stripes adjacent said index strips; and
   wherein said correction means are responsive to said video modulator means for producing said correction signals corresponding to excitation of said adjacent phosphor stripes.

5. The display system of claim 4 wherein said correction means further include phosphor simulation means for simulating the response characteristic of the light-emitting phosphor of said index strips; and
   delay means coupled between said video modulator means and said phosphor stimulation means for adjusting said correction signal to compensate for the delay in said display system.

6. The display system of claim 5 wherein said index signal means further includes; differentiation means for determining the center of said index strips, pulse means for generating index signal pulses responsive to said differentiation means and gating means for eliminating signals between successive pulses from said pulse means.

7. A color display system comprising:
   a color picture tube including an electron beam deflectable across a faceplate bearing a pattern of periodic stripes of different colored light-emitting phosphor interspersed with stripes of inert material and having a plurality of phosphor index strips overlying predetermined ones of said stripes of inert material in a regular manner;
   wide-band index signal means for generating an index signal denoting the position of said electron beam on said pattern;
   a photo multiplier tube responsive to electron bombardment of said index strips coupled to said index signal means;
   video modulator means producing color video drive signals for said electron beam for bombarding different ones of said phosphor stripes; and
   correction means in said index signal means for developing a correction signal to compensate for distortion of said index signal caused by undesired response of said photo multiplier tube to electron bombardment of phosphor stripes adjacent to said index strips, said correction means being coupled to said video modulator means for generating correction signals responsive to said color video drive signals corresponding to said color phosphor stripes adjacent to said index strips, said correction means including means for delaying, correcting and mixing said color video drive signals for producing opposite polarity signals to those from said photo multiplier tube, phosphor simulation means simulating the response of said phosphor of said index strips and means supplying said opposite polarity signals to said phosphor simulation means.

8. The display system of claim 7, wherein said correction means includes differentiation means for locating the center of said index strips coupled to the outputs of said photo multiplier tube and said phosphor simulation means;
   threshold detector means for generating an index pulse corresponding to the zero crossing of said differentiation means output; and
   gate means for disabling any output from said threshold detector means between index pulses.

9. The display system of claim 8 wherein said gate means comprise a one-shot multivibrator coupled to said threshold detector means; and
   an AND gate having one input coupled to said threshold detector means and another input coupled to said one-shot multivibrator.

10. A color display system comprising:
    a color picture tube including an electron beam deflectable across a faceplate bearing a pattern of periodic stripes of different colored light-emitting phosphor interspersed with stripes of inert material and having a plurality of phosphor index strips overlying predetermined ones of said stripes of inert material in a regular manner;
    wideband index signal means for generating an index signal denoting the position of said electron beam on said pattern;
    a photo-multiplier tube, developing an output signal responsive to electron bombardment of said index strips, coupled to said wideband index signal means;

pulse generating means in said wideband index signal means for generating index pulses from the output of said photo-multiplier tube; and means for disabling any output from said pulse generator means between index pulses.

11. The display system of claim 10 wherein said wideband index signal means further include;

phosphor compensation means coupled to the output of said photo-multiplier tube;

differentiation means for locating the centers of said index strips coupled to said phosphor compensation means; and threshold detector means coupled to said differentation means for generating said index pulse corresponding to zero crossings of the output of said differentiation means.

12. The display system of claim 11 wherein said means for disabling include gate means responsive to an index pulse for disabling the output of said pulse generator for a predetermined time period less than the time between adjacent index pulses.

* * * * *